United States Patent [19]

Perkins, Jr.

[11] 4,033,081
[45] July 5, 1977

[54] MODULAR BUILDING SYSTEM

[76] Inventor: Fred M. Perkins, Jr., 713 W. Second, Little Rock, Ark. 72201

[22] Filed: May 16, 1975

[21] Appl. No.: 578,193

[52] U.S. Cl. .................................. 52/263; 52/284; 52/648; 52/79.12; 52/721; 85/13; 126/247
[51] Int. Cl.² ........................................ E04B 1/00
[58] Field of Search ............ 52/648, 650, 262, 263, 52/289, 284, 293, 282, 126, 731, 721, 234, 690, 637, 633, 751, 752, 122, 720

[56] References Cited

UNITED STATES PATENTS

| | | | |
|---|---|---|---|
| 2,574,074 | 11/1951 | Vogel | 52/721 X |
| 2,733,786 | 2/1956 | Drake | 52/720 X |
| 3,226,894 | 1/1966 | Burchardt et al. | 52/185 X |
| 3,377,756 | 4/1968 | Polhamus | 52/731 X |
| 3,474,582 | 10/1969 | Wah et al. | 52/648 X |
| 3,640,036 | 2/1972 | Nakazawa et al. | 52/126 |
| 3,785,109 | 1/1974 | Letourneur | 52/690 X |
| 3,861,102 | 1/1975 | Hodge | 52/300 X |
| 3,927,498 | 12/1975 | Benedetti | 52/284 X |

FOREIGN PATENTS OR APPLICATIONS

| | | | |
|---|---|---|---|
| 631,028 | 3/1927 | France | 52/283 |

*Primary Examiner*—Price C. Faw, Jr.
*Assistant Examiner*—Carl D. Friedman
*Attorney, Agent, or Firm*—Berman, Aisenberg & Platt

[57] ABSTRACT

A modular building system which utilizes as a basic building block thereof an elongated hollow structural frame member preferably formed of fiberglass. The structural frame member comprises a substantially flat elongation having longitudinal slots formed at both ends thereof which slideably engage with support means in the form of other modular building blocks. The frame member further has a pair of horizontal members formed integrally therewith which extend transversely near the upper and lower ends thereof. The horizontal members are attachable to adjacent frame members for structural support. The frame member further has a U-shaped cross-section extending longitudinally over which is formed a metallic channel, also U-shaped so as to define a conduit through which electrical wiring may be pre-routed, the metal piece further serving as a surface to which interior or exterior wall panels may be attached by means of sheet metal screws or the like.

The invention is further directed toward other modular building blocks which cooperate with the basic structural frame member, such as joist brackets, foundation pedestals, roof panels, floor panels, as well as accessory mounting and interconnection hardware. Also disclosed are preferred embodiment heating means which include a solar panel hot water heater, a warm air solar panel, a solar absorption wall panel, and a wind-powered friction heater for water.

24 Claims, 59 Drawing Figures

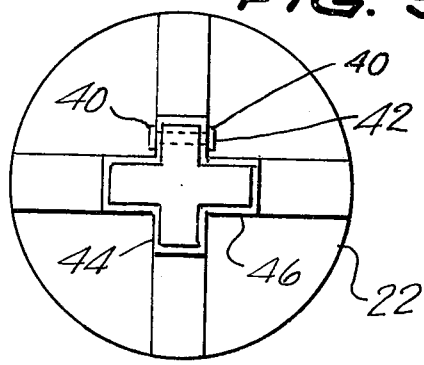
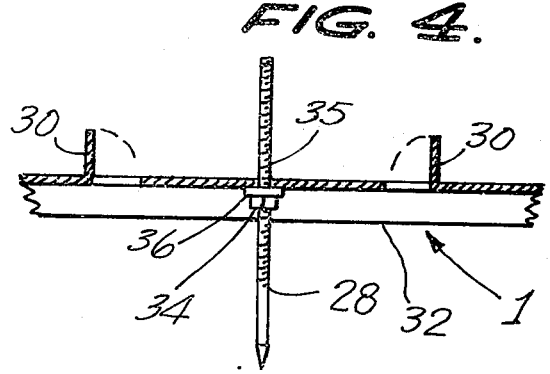
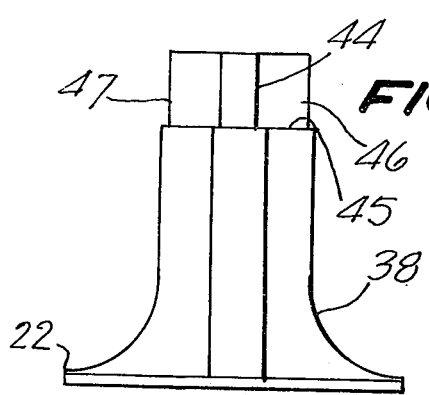
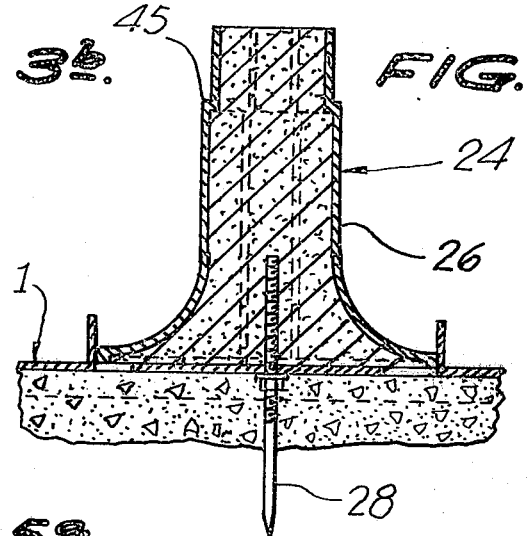
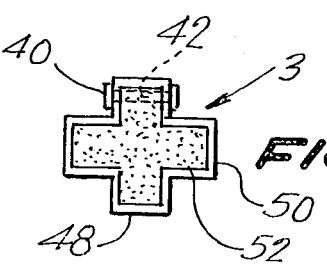
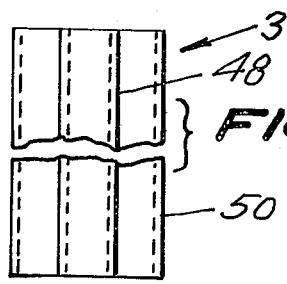
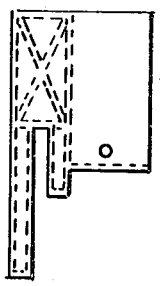
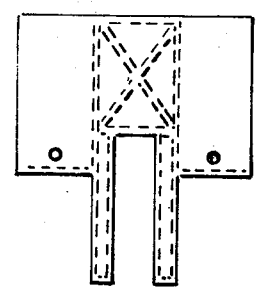
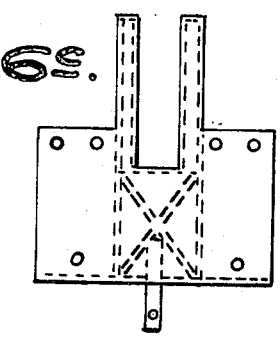

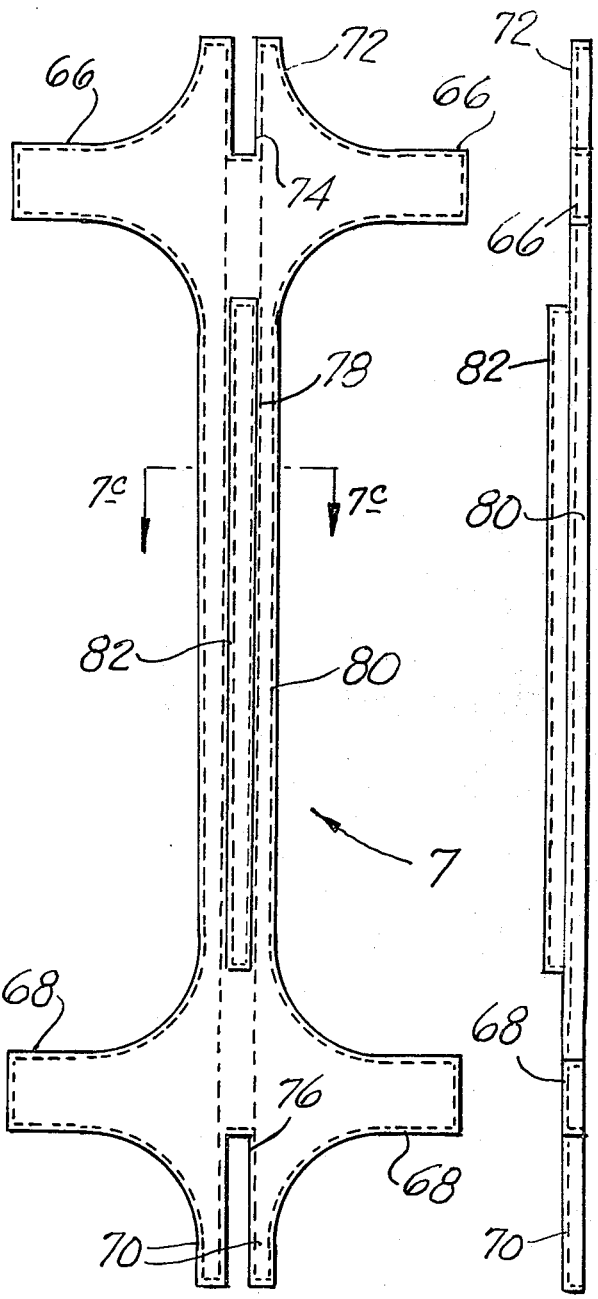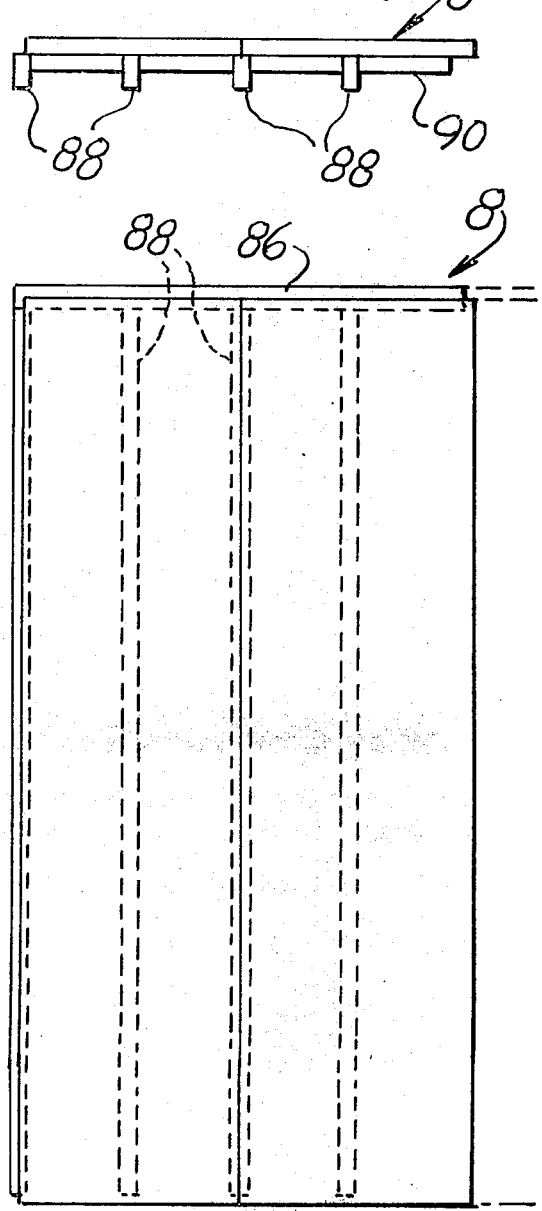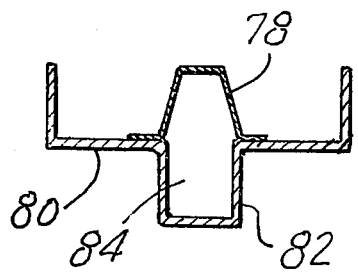

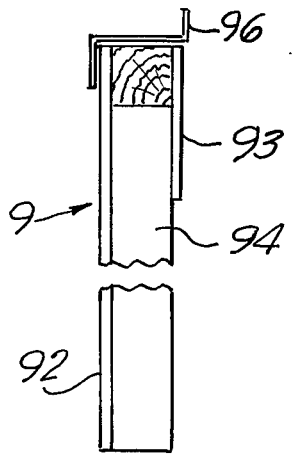
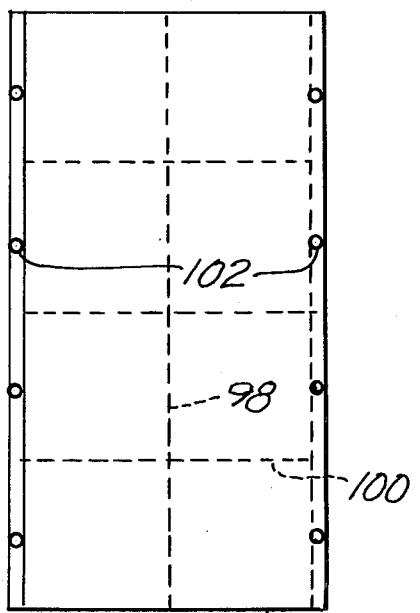
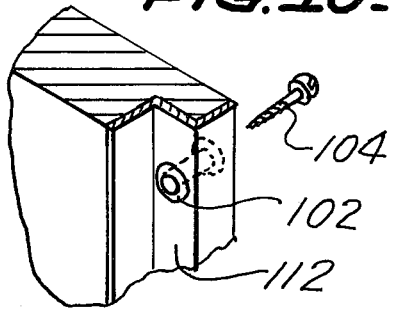
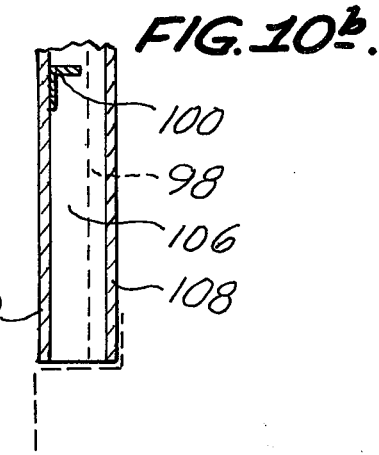
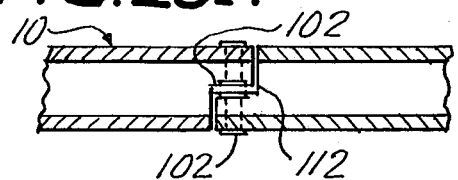
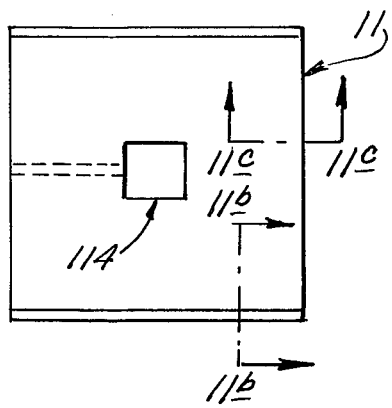
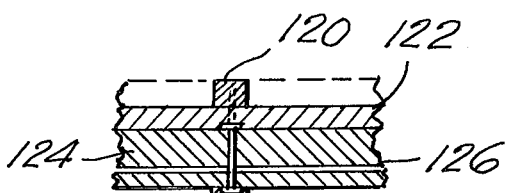
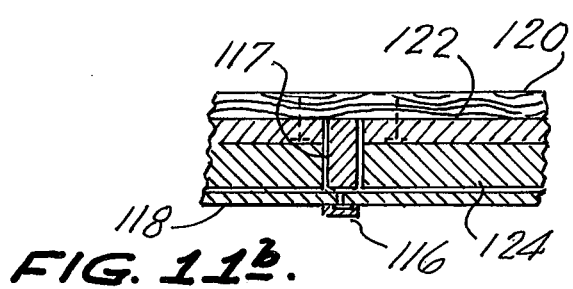

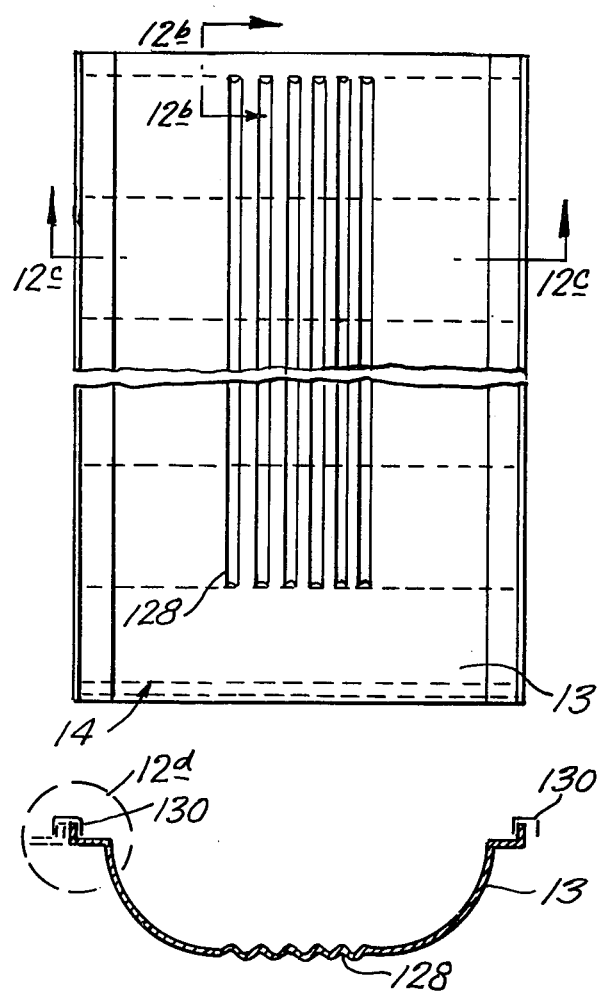
FIG. 12a.
FIG. 12c.
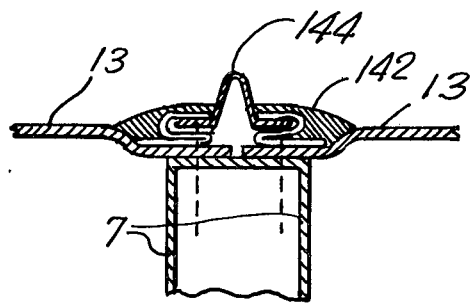
FIG. 12b.
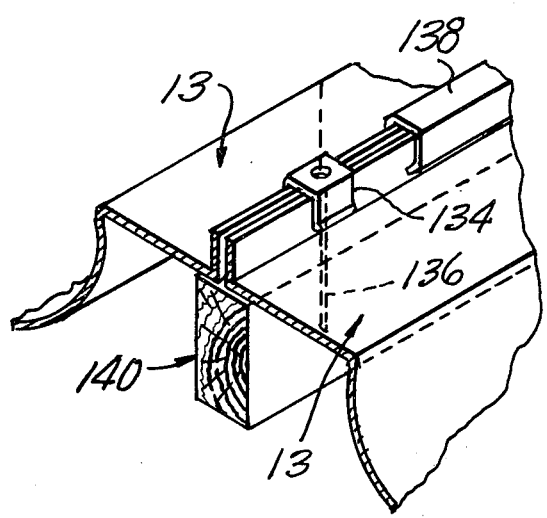
FIG. 12d.
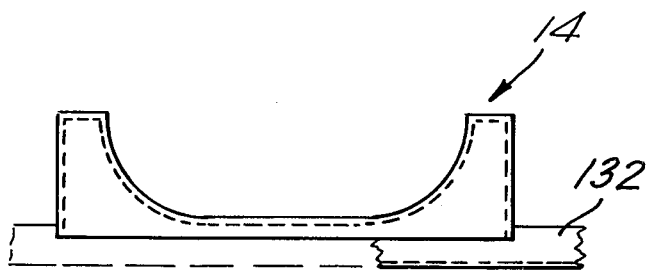
FIG. 13a.
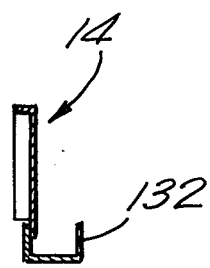
FIG. 13b.

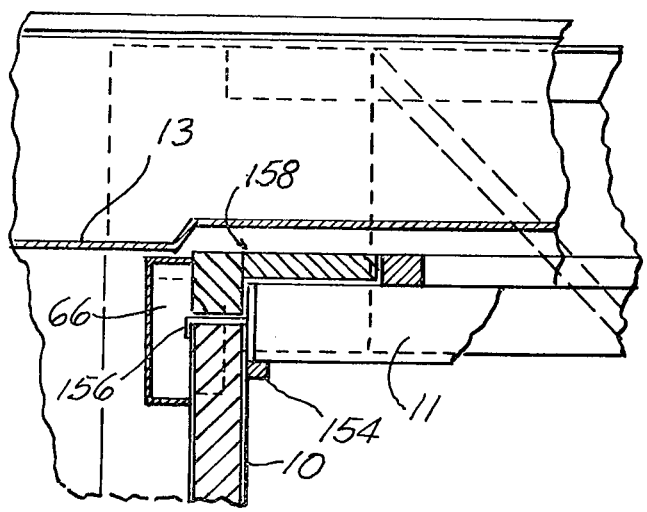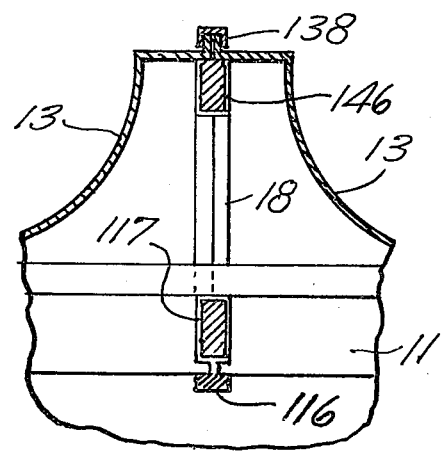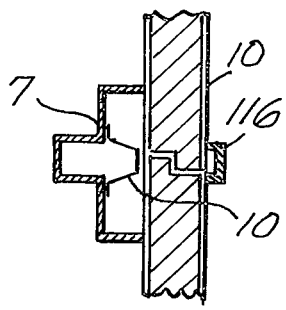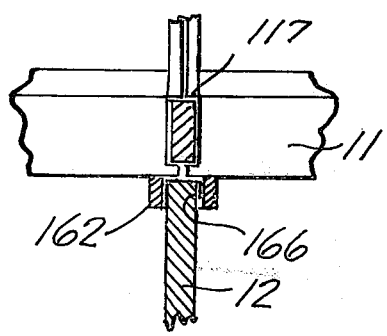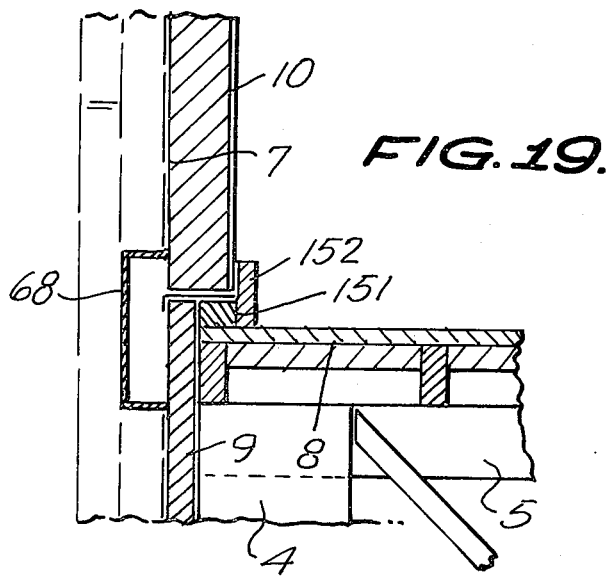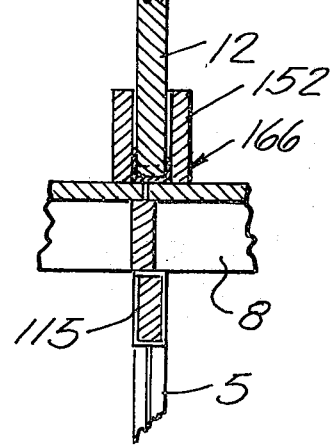

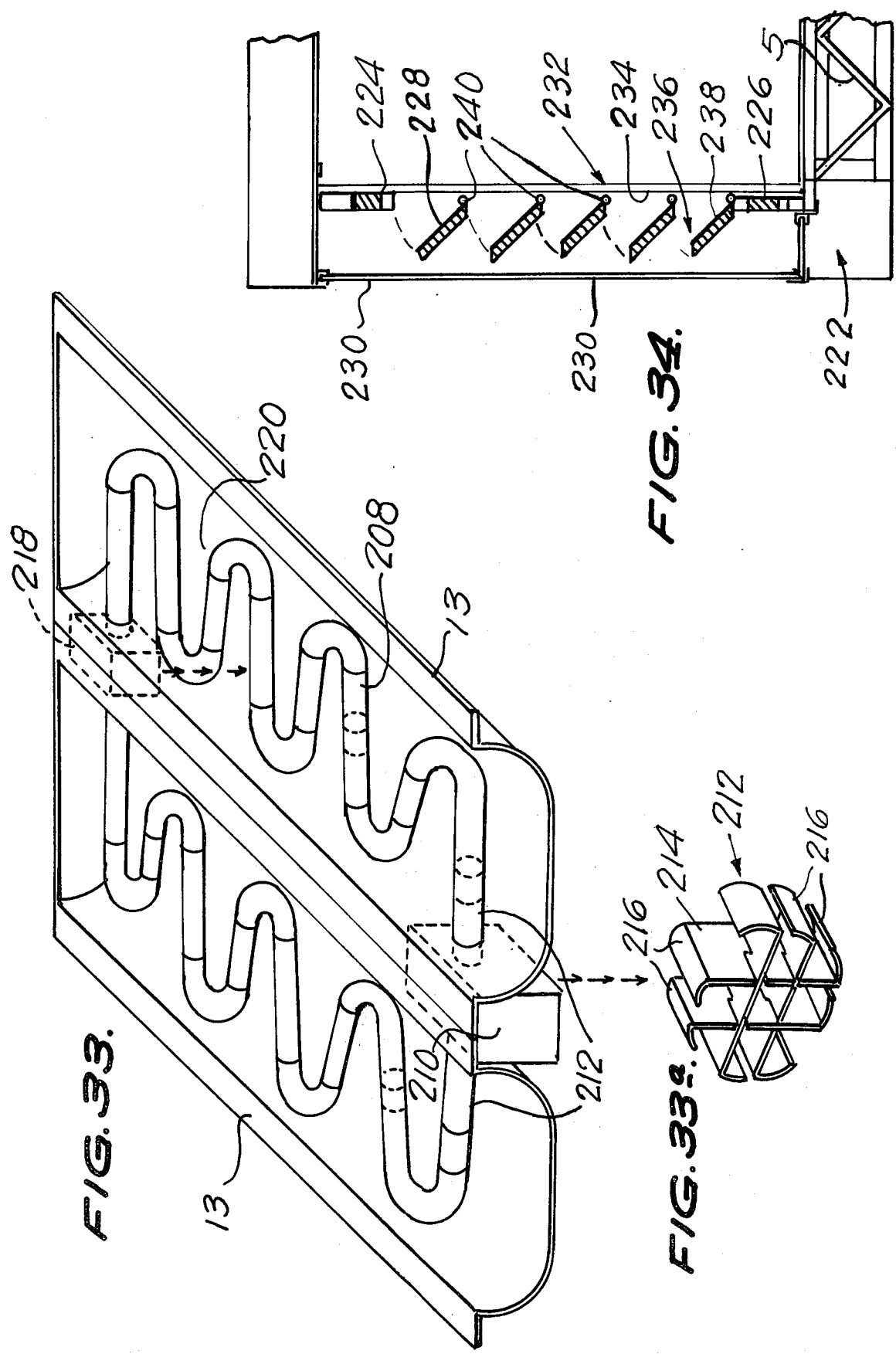

FIG. 35.
FIG. 36.
FIG. 37.
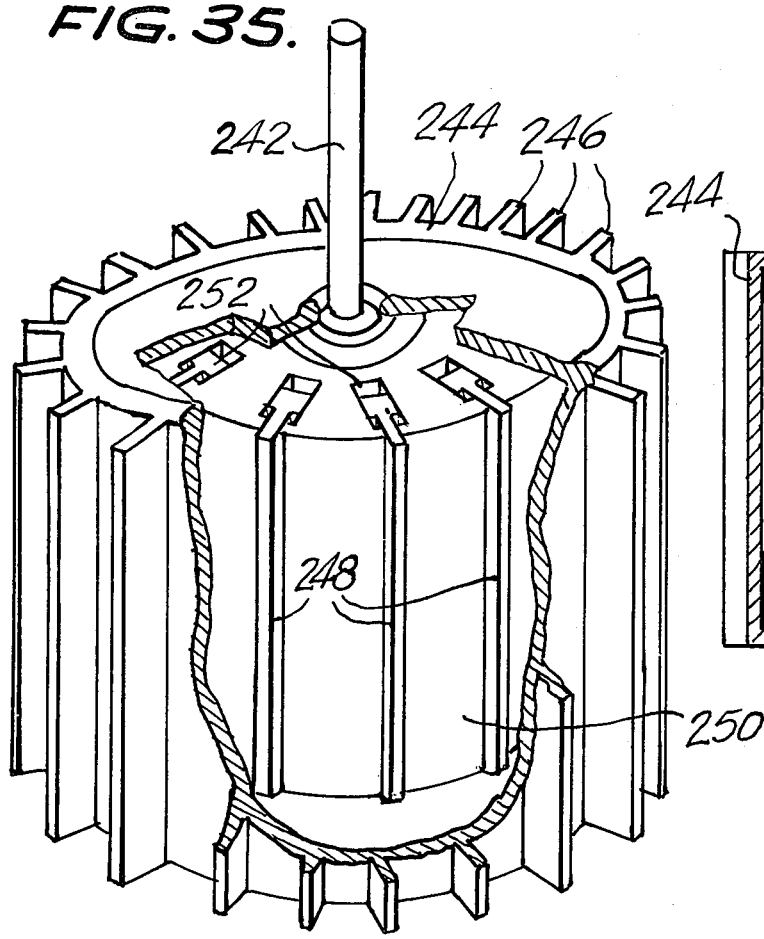
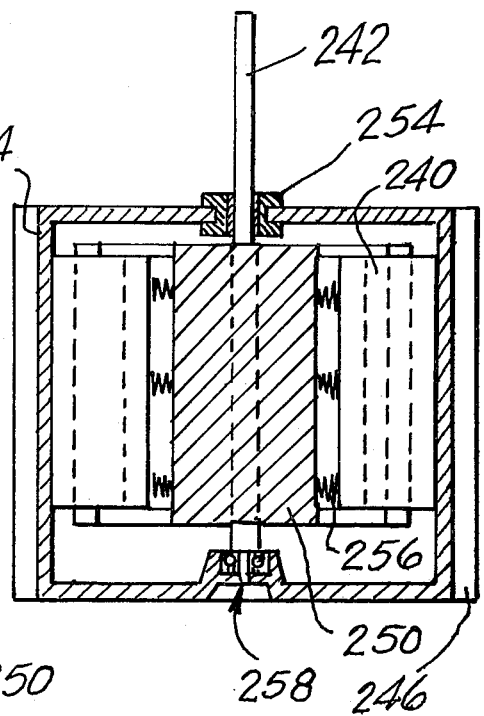
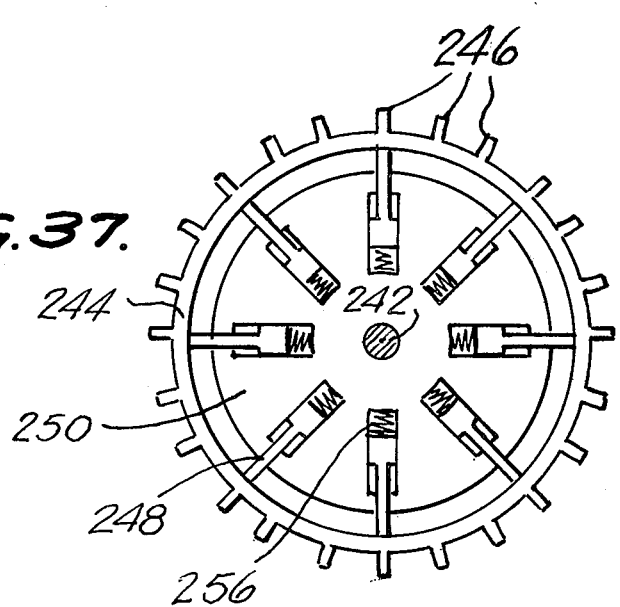

MODULAR BUILDING SYSTEM

BACKGROUND OF THE INVENTION

1. Field of the Invention

The present invention is related generally to a building system and, more particularly, is directed toward a building system which utilizes prefabricated building components.

2. Description of the Prior Art

Numerous prefabricated housing systems have been proposed, as exemplified by U.S. Pat. Nos. 3,474,582 to Wah et al; 3,712,007 to Kump; and 3,802,139 to Eischen et al. It is a general object of modular housing systems that the individual components, as well as the finished product, be durable, easily erected, low in cost without sacrificing quality or durability, and provide flexibility such that various interior and exterior designs are feasible. From the point of view of economics, it is desirable that such modular units be easily and inexpensively heated, well-insulated, and incorporate means for maximizing environmentally provided energy producers.

It is also preferred that such modular structures be adaptable to a variety of building terrains and slopes and require minimum excavation and foundation work. A further desirable characteristic is that the individual components require minimal skilled labor to assemble, it being highly desirable that the owner himself be capable of erecting his own housing unit. The prior art attempts, as exemplified by the above-cited patents of which I am aware, at meeting such specifications have generally fallen short in one or more particulars. For example, the Kump design requires special construction crews and assembly workers in order to transport, establish, and install the modular housing unit. The Wah et al building system appears inflexible in design and is structurally questionable. In none of the prior art structures is there disclosed or suggested integral heating means which take advantage of the modular nature of the housing unit.

OBJECTS AND SUMMARY OF THE INVENTION

It is accordingly a primary object of the present invention to provide a modular building system which utilizes prefabricated components that are durable and low in cost.

Another object of the present invention is to provide a novel modular building system which utilizes prefabricated components that are easily transported and occupy a minimum of warehouse space.

A further object of the present invention is to provide a modular building system in which the prefabricated components thereof may be easily assembled on the housing site by relatively unskilled workers.

A still further object of the present invention is to provide a modular building system that provides great design flexibility in order to meet the public's demand for new and innovative housing structures.

A still further object of the present invention is to provide a modular building system which, for final construction, requires only standard building tools.

A still further object of the present invention is to provide a modular building system which is structurally adaptable to varying terrains and slopes.

Another object of the present invention is to provide a modular building system utilizing prefabricated components into which may be incorporated a warm air solar panel for heating purposes.

A still further object of the present invention is to provide a modular building system into which may be adaptable solar absorption wall panels for solar heating of air.

A still additional object of the present invention is to provide a modular building system which utilizes as a hot water heater a wind-powered friction heating device.

Another object of the present invention is to provide a modular building system which incorporates the use of a solar roof panel connected to the standard modular roof panels and which comprises a plurality of hot water solar heating panels of novel design and construction.

The foregoing and other objects are attained in accordance with one aspect of the present invention through the provision of a modular building system which comprises as a basic building block thereof a substantially planar elongated frame member which has a pair of horizontal members formed integrally therewith and which extend transversely therefrom near the upper and lower ends thereof. The upper and lower ends have a longitudinal slot formed therein, said slot being colinear with the elongated axis of the frame member and transverse to the horizontally extending members. The longitudinal slots are adapted for slideable engagement with other modular members of the building system. For example, the lower longitudinal slot is adapted to be interlockingly engaged with a similarly sized longitudinal slot formed in the upper portion of a floor joist bracket. The floor joist bracket is constructed of substantially planar mirror-image halves which clamp the ends of a floor joist therebetween. The longitudinal slot is formed at the upper portion of the joist bracket by a pair of parallel extending projections. The upper slot of the floor joist bracket engages the lower slot of the frame member in a 90° interleaving relationship. The floor joist bracket includes a pair of downwardly extending anchor brackets which are fastened to the upper portion of a foundation pedestal. The foundation pedestals, in the form of a hollow, concrete-filled when finished, body having a circular base and a pair of cross members tapering upwardly from the base, are spaced along the foundation by a foundation pedestal spacer which has leveling means in the form of a plurality of threaded stakes placed at predetermined intervals therealong.

In accordance with another aspect of the present invention, the frame member of the modular building system includes means for pre-routing electrical wire therethrough, as well as means for mounting wall panels thereto. Further modular building blocks include a roof panel, a foundation pedestal extension member, a prefabricated floor panel, as well as chips and connectors for interlocking and fastening such components to one another.

In accordance with a further aspect of the present invention, the modular building system further comprises a solar roof panel, of the same general dimensions as a regular roof panel, but which has a base portion having a plurality of parallel spaced grooves formed integrally therein. The grooves are interdigitated so as to define a continuous fluid path from one edge of the roof panel to another. The fluid path is closed by a metal plate bonded to the base of the solar roof panel by means of silicon caulking which is placed along the grooves. The metal plate is blackened on the outer sun-facing surface thereof so as to act as an effective heat transfer mechanism for the fluid flowing through the sealed conduit. A pair of glass layers are placed over the metal plate for insulative purposes.

In accordance with still another aspect of the present invention, the modular building structure includes a warm air solar panel which comprises a modified standard roof panel having a darkened metallic pipe snaked therethrough. Means are provided for circulating air through the pipe so as to be heated by the solar radiation. A plurality of metallic inserts are preferably positioned within the metallic pipe to assist in heat transfer of the air flowing therethrough.

In accordance with still another aspect of the present invention, the modular building system further comprises a solar absorption wall panel which includes a heat transfer medium defined by a glass outer wall, a metallic inner wall whose surface facing the glass outer wall is blackened, and means for introducing and extracting air through the heat transfer medium. Within the space defined by the glass outer wall and the metallic inner wall are positioned a plurality of insulation panels which are pivotable about pivot axes which run substantially parallel to the ground in order to allow the black surface of the inner wall to be selectively exposed to sunlight in order to control the heat radiation therefrom. The pivoting of the insulation panels may be either thermostatically or manually controlled. One of the planar surfaces of each insulation panel preferably comprises a reflective surface to reflect solar rays to the inner blackened wall when positioned at selected angles for further assisting in the heat transfer operation.

In accordance with yet another aspect of the present invention, the modular building system further comprises a wind powered friction heater utilized in conjunction with a hot water tank for heating water therein. The friction heater includes a rotatable shaft which is actuated by an externally positioned wind mill. The shaft is connected to a cylindrical housing which includes a plurality of radially placed vertical slots positioned along the circumference thereof. Within the slots are positioned a plurality of nylon brushes which are preferably urged outwardly by a plurality of associated spring members. The cylindrical housing and brush structure is contained within a similar cylindrical metallic casing such that the nylon brushes are urged against the inner cylindrical surface thereof. The effectuate heat transfer upon rotation of the inner housing, the outer casing further includes a plurality of spaced fins which extend radially therefrom to act as an effective heat transfer medium to the surrounding water within the water tank.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIGS. 3a, 3b and 3c are respectively plan, elevation and sectional views of a preferred embodiment of a foundation pedestal component according to the present invention;

FIG. 4 is a side elevational view of a foundation pedestal spacer constructed in accordance with the present invention;

FIGS. 5a and 5b are respectively plan and elevational views of a foundation pedestal extension member in accordance with the present invention;

FIGS. 6a, 6b and 6c are side views respectively of an outside wall roof joist bracket, a center wall roof joist bracket, and a center wall floor joist bracket, all constructed in accordance with the principles of the present invention;

FIGS. 7a and 7b are respectively front elevation and side views of a preferred embodiment of the structural frame member in accordance with a preferred embodiment of the present invention;

FIGS. 8a and 8b are respectively plan and sectional views of a floor panel utilized with the present invention;

FIG. 9 is a sectional view of a foundation panel utilized in the modular building system of the present invention;

FIGS. 10a, 10b, 10c, and 10d are elevation, sectional, and perspective views of an exterior wall panel constructed in accordance with the present invention;

FIGS. 11a, 11b and 11c are plan and sectional views of a ceiling panel and panel joint in accordance with the present invention;

FIG. 12a is a plan view of a prefabricated roof panel of the modular building system of the present invention;

FIG. 12b is a sectional view taken along lines 12b—12b of FIG. 12a;

FIG. 12c is a sectional view of the roof panel taken along lines 12c—12c of FIG. 12a;

FIG. 12d is a perspective view of a roof panel joint of the roof panel seen in cross section in FIG. 12c;

FIGS. 13a and 13b are respectively elevational and sectional views of a roof panel end cap constructed in accordance with the present invention;

FIG. 19 is a sectional view of an exterior bearing wall section taken along lines 19—19 of FIG. 16;

FIG. 20 is a sectional view of a typical ceiling joint connection taken along lines 20—20 of FIG. 1;

FIG. 21 is a sectional view of an interior partition connection at the ceiling;

FIG. 22 is a sectional view of an interior partition connection at the floor in accordance with the present invention;

FIG. 24 is a sectional view of an exterior bearing wall at the roof connection taken along lines 24—24 of FIG. 16;

FIG. 25 is a sectional view of the structural frame member 7 and exterior walls 10 taken at a frame joint along lines 25—25 of FIG. 16;

FIG. 33 is a perspective view illustrating a warm air solar panel constructed in accordance with a preferred embodiment of the present invention;

FIG. 33a is a perspective view of a preferred embodiment of a metal insert fixture utilized in conjunction with the warm air solar panel of FIG. 33;

FIG. 34 is a schematic sectional view of a solar absorption wall panel in a preferred embodiment utilizeable with the modular building structure of the present invention;

FIG. 35 is a perspective view, partially cut away, showing the components of a preferred embodiment of a wind-powered friction heater in accordance with the present invention;

FIG. 36 is a side-sectional view of the friction heater seen in FIG. 35; and

FIG. 37 is a cross-sectional view of the friction heater depicted in FIG. 35.

DETAILED DESCRIPTION OF THE PREFERRED EMBODIMENTS

Figure 1:
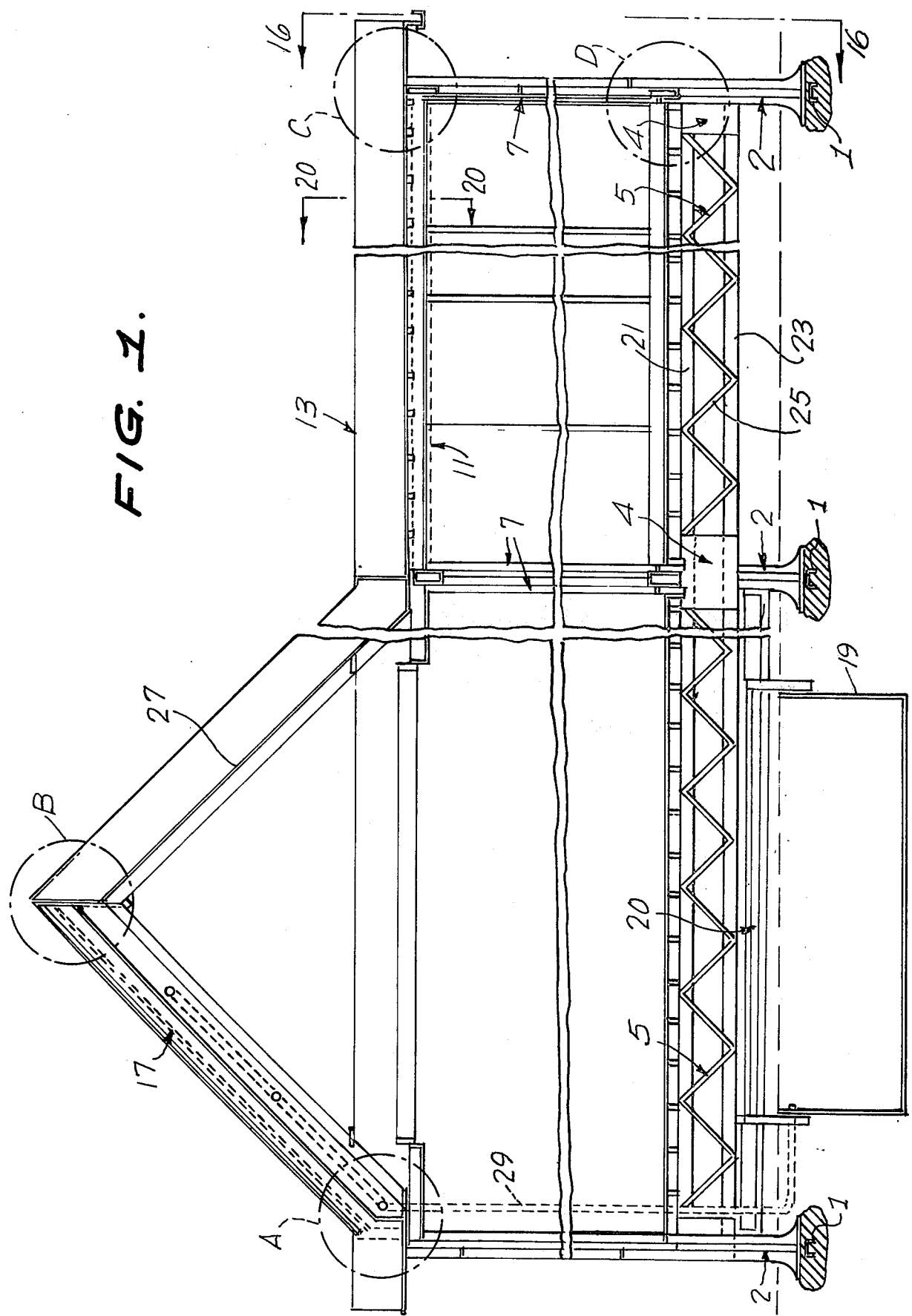
FIG. 1 is a sectional view of a typical modular housing unit constructed with prefabricated components in accordance with a preferred embodiment of the present invention.

Referring now to the drawings, wherein the reference numerals designate identical or corresponding parts throughout the several views, and more particularly to FIG. 1 thereof, there is illustrated a sectional view of a typical building constructed with preferred embodiments of the modular building components in accordance with the present invention. The building is seen to consist basically of a number of foundation pedestals 2 which support floor joists 5 by means of floor joist brackets 4. Foundation pedestals 2 are filled with concrete and preferably placed upon foundation pedestal spacers 1 which include leveling means. Each floor joist 5 consists of a top chord 21, a bottom chord 23, and interconnecting bracing 25. The top and bottom chords and bracing are interconnected by a truss web member to be described in more detail hereinafter.

Interlocking with the floor joist brackets 4 are structural frame members 7 to which exterior partition walls are attached in a manner to be described in more detail hereinafter. Roof joist brackets, not shown in this view, are connected to the upper portion of frame members 7 similar to the connection of floor joist brackets 4. A roof joist extends laterally in the same manner as floor joist 5 between respective roof joist brackets, concealed in this view by roof panel 13. The roof may further include a sloping section 27 the mirror-image portion of which comprises a solar heating panel 17, to be described in more detail hereinafter. Also shown in FIG. 1 is a water storage tank 19 which is connected to solar panel 17 by means of conduit 29 which transfers warm water thereto. A heat transfer air plenum 20 is positioned above the solar heated water storage tank 19.

Figure 30:
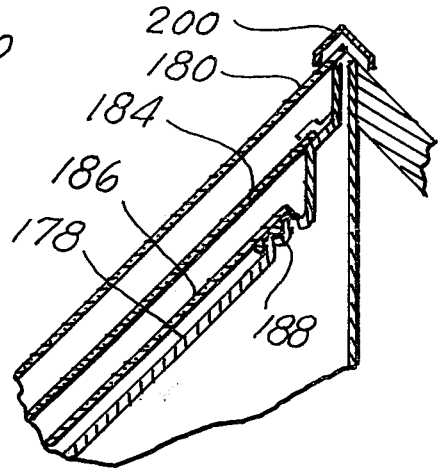
FIG. 30 is a sectional view showing the top edge detail of the solar collector roof panel taken along lines 30—30 of FIG. 28.
Figure 31:
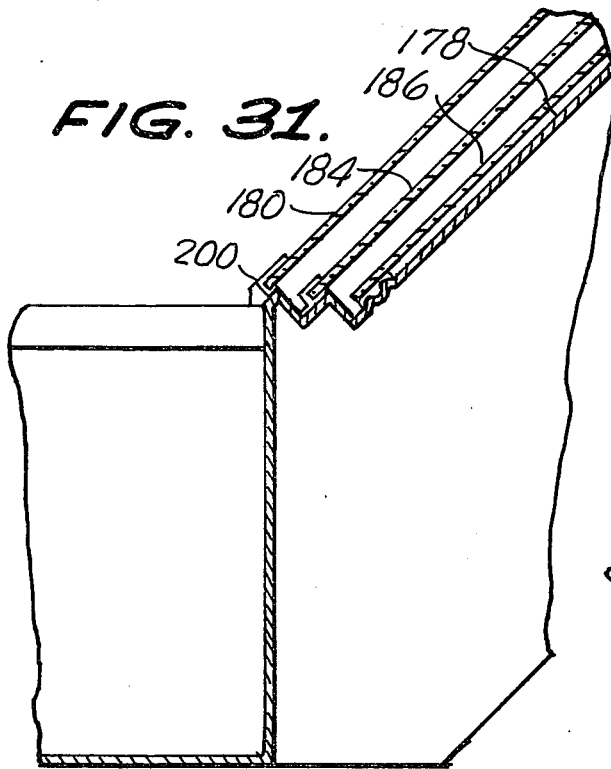
FIG. 31 is a sectional view showing the bottom edge detail taken along lines 31—31 of FIG. 28.

Portion A of the structure shown in FIG. 1 may be seen in more detail in FIG. 31; portion B may be seen in more detail in FIG. 30; portion C is illustrated in more detail in FIG. 19.

Figure 2:
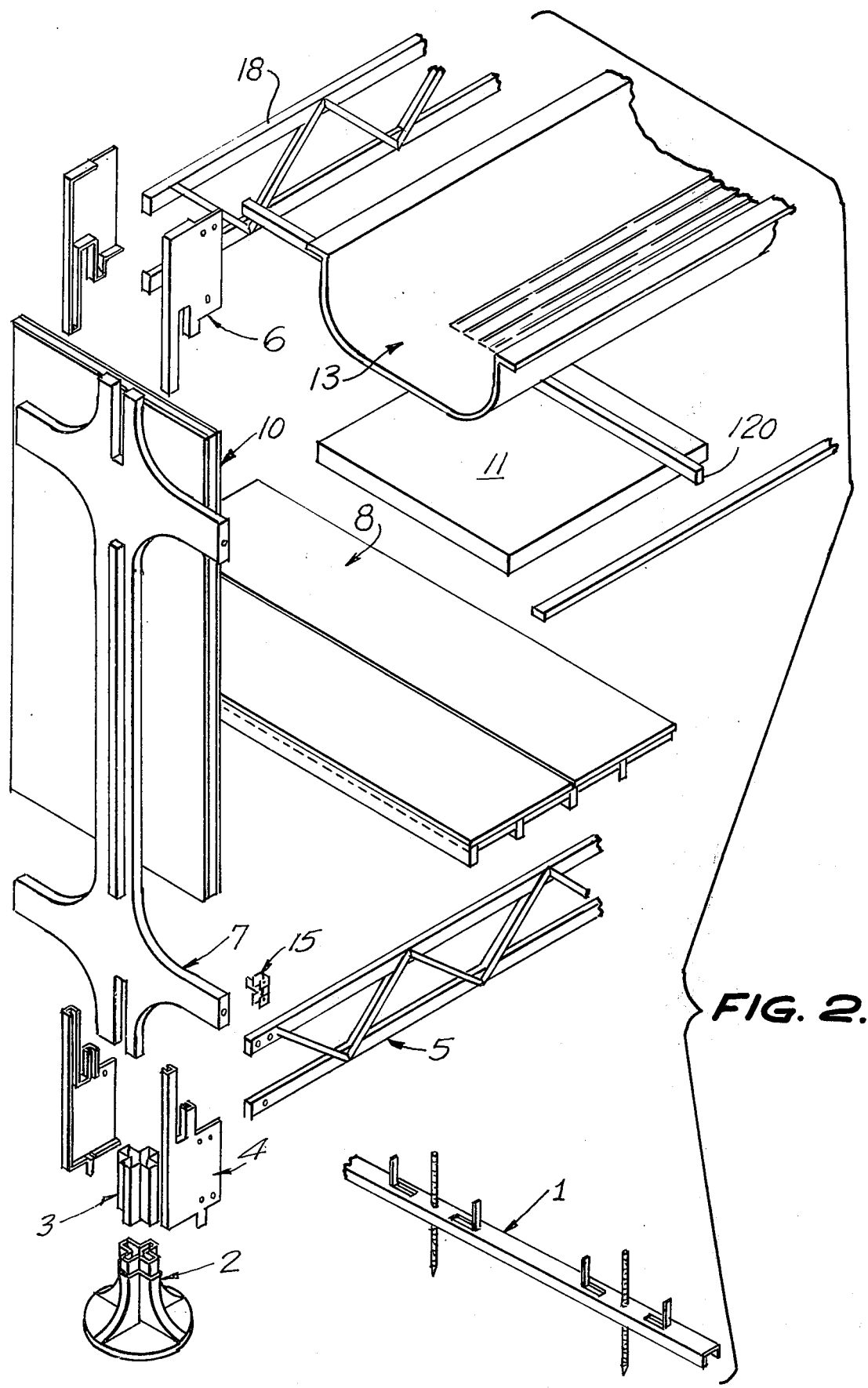
FIG. 2 is an isometric exploded view which illustrates typical constituent components of the modular building system constructed in accordance with a preferred embodiment of the present invention.

Referring now to FIG. 2, an exploded perspective view of the main constituent modular components of the building system shown in FIG. 1 are illustrated, each of which is described in more detail hereinafter. The foundation pedestal 2 is seen to fit in a preassigned space on a foundation pedestal spacer 1. The floor joist bracket 4 is shown in two halves between which is fitted a floor joist 5. Floor joist bracket 4 is connected to the foundation pedestal 2 in a manner to be described in more detail hereinafter. A foundation pedestal extension member 3 may be provided at certain job sites when required to compensate for grade differences on sloping sites. Structural frame member 7 interlocks when both the floor joist brackets 4 and the roof joist bracket 6. Also illustrated in FIG. 2 is a panel connector 15 for connecting frame member 7 to adjacent members. An exterior wall panel 10 may be fastened to frame member 7, while a floor panel 8 may be fastened to floor joist 5. A ceiling panel 11 may be attached to the roof joist 18 by means of a joist bridge 120.

The foundation pedestal 2 is depicted more clearly in FIGS. 3a, 3b and 3c and is seen to comprise a substantially circular base 22 upwardly from which extends tapered sides 38 which defines a pair of cross-channels 44 and 46. A recess 45 is positioned circumferentially about the entire pedestal body near the top thereof and defines a step of substantially the same thickness as the thickness of the pedestal. This step is designed so as to receive a similarly sized foundation pedestal extension which is depicted in FIGS. 5a and 5b. Foundation pedestal 2 is originally a hollow fiberglass unit which is subsequently filled with concrete to provide external reinforcement for the remainder of the structure. The nature of foundation pedestal 2 makes it possible to utilize smaller amounts of concrete which may be readily and easily mixed from, for example, a standard bag of concrete, on the job site, thereby obviating the necessity for cement mixing trucks and other heavy equipment.

The foundation pedestal spacer 1 is depicted in side section in FIG. 4 and is seen to comprise a metal or plastic channel-shaped piece 32 having a plurality of threaded stakes positioned at predetermined distances along the length thereof to provide the correct spacing for the foundation pedestal 1. A suitable spacing would be, by way of example, 4 feet o.c. The manner of installation is to place the metal stakes 28 in the bottom of a previously dug foundation trench at approximately the inter-pedestal spacing desired. The channel 32 is then set on top of stake 28 and leveled by means of the washer 36 and nut 34 on stake 28. A slotted hole 35 in channel 32 is somewhat larger than the diameter of stake 28 so as to obviate the necessity for precision positioning. On sloping ground, the spacers are cut to the required length and dropped to a lower elevation. A plumb bob, square, or the like, is then utilized to get the two ends aligned one above the other to continue the desired horizontal spacing.

FIGS. 5a and 5b illustrate a plan and elevation view of a foundation pedestal extension which is similar in construction to pedestal 2 but is designed to be cut to the correct length at the job site in order to compensate for grade differences on sloping sites. Pedestal extension 3 preferably comprises a glass-filled polyester shelf having a pair of extension cross-channels 48 and 50. Extension 50 is adapted to fit upon and be bonded to the upper portion 47 of pedestal 2, and is further filled with concrete when in place. Also pictured in FIGS. 3a and 5a are the downwardly extending connectors 40 for floor joist bracket 4 and a bolt 42 for anchoring the floor joist bracket 4 to the pedestal 2 or pedestal extension 3.

Figure 6:
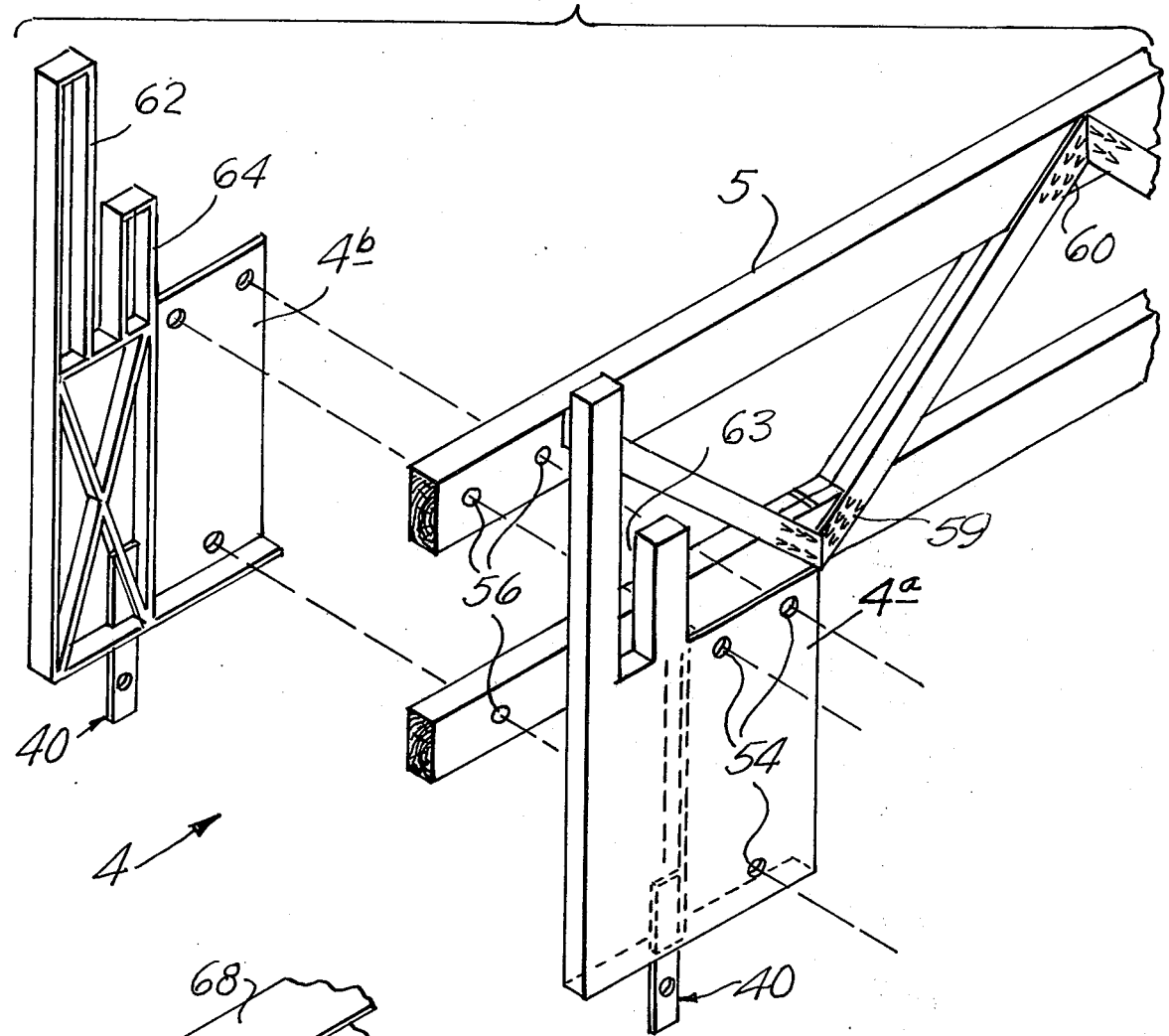
FIG. 6 is an exploded perspective view illustrating the interconnection of an outside wall joist bracket and its associated floor joist in accordance with the principles of the present invention.

Referring now to FIG. 6, there is illustrated a perspective and exploded view of floor joist bracket 4 and associated floor joist 5. Floor joist bracket 4 is seen to consist of a two-piece unit 4b and 4a formed from fiberglass and utilized for connecting the floor joist 5 to the structural frame member 7. For this latter purpose, there are provided a pair of upwardly extending support members 62 and 64 which define a longitudinal slot 63 therebetween. Slot 63 is adapted to engage a similar longitudinal slot in structural frame member 7 to be described below. Floor joist brackets 4 further contain a number of mounting holes 54 which coincide with a like number of mounting holes 56 formed in the upper and lower trusses of floor joist 5. Extending downwardly from each half of bracket 4 are a pair of connectors or anchor brackets 40 for anchoring floor joist bracket 4 to the associated foundation pedestal, as seen more clearly in FIGS. 3a and 5a.

Floor joist 5, which incidentally is substantially identical to roof joist 18, is preferably constructed from standard dimension lumber, the size of which is determined by the span length and the floor or roof loads. The interconnecting bracing 25 is covered by a truss web member 58 which is preferably comprised of a stamped metal piece anchored to the wood members by punched prongs at the bottom 59 and top 60 portions thereof.

Depicted in FIGS. 6a, 6b and 6c are respectively side views of an outside wall roof joist bracket, a center wall roof joist bracket, and a center wall floor joist bracket, the outside wall floor joist bracket being depicted in FIG. 6.

A front view of the structural frame member 7 is shown in FIG. 7a, the side view thereof depicted in FIG. 7b, while a cross-sectional view taken along lines 7c—7c being depicted in FIG. 7c. Stuctural frame member 7 is seen to comprise a vertical stem 80 which has a longitudinal U-shaped conduit integrally formed along a major portion of its midsectional length. Extending horizontally and integrally from the upper portion of frame member 7 is a horizontally member 66, while a lower horizontal member 68 extends near the lower portion of frame member 7. Formed in the upper end of frame member 7 are a pair of upper vertical members 72 which form an upper mounting slot 74, while at the lower portion thereof a pair of lower vertical members 70 form a lower mounting slot 76 therein. Attached to the reverse side of vertical stem 80 along the length thereof is a metal strip 78 that reinforces the fiberglass construction of frame member 7 as well as provides a surface for wall panels to be sealed against and attached to with sheet metal screws, clips and the like. Metal strip 78 also serves in conjunction with longitudinal conduit 82 for establishing an inner space 84 through which electrical wire may be routed. The electrical wiring is preferably completed prior to the installation of the wall panels. Where receptacles or switches are required, a cut out is provided in the wall panel.

For door or corner units modifications of the basic structural frame member 7 as seen in FIG. 7a are necessary. That is, for door units the lower horizontal member 68 is deleted, while for corner units the upper and lower horizontal members on one side are deleted.

Figure 15:
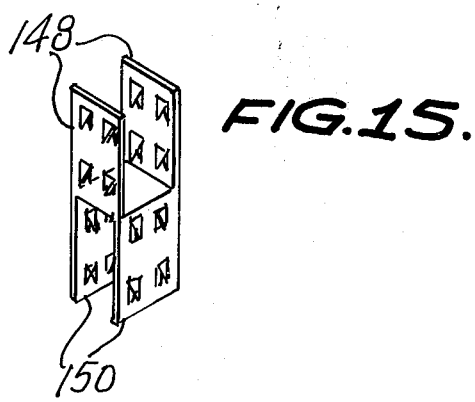
FIG. 15 is a perspective view of a preferred embodiment of a floor panel connector.

FIGS. 8a and 8b illustrate exemplary floor panels which may be preassembled in either 2 feet by 8 feet units or 4 feet by 8 feet units. As seen in FIG. 8b, the floor panel comprises a sheet of particle board or plywood 8 which overlies a plurality of transversely positioned 2 × 4s support pieces 88. Positioned between support pieces 88 is insulation 90. Instead of particle board of plywood, floor panel 8 may be comprised of fiberglass which would, in turn, allow the rigid insulation to be installed on the bottom chord of the floor joist to thereby enable the entire floor cavity to be utilized for a heating and air conditioning supply plenum. Such a fiberglass floor would give radiant heat and would thereby solve the cold floor problem that plagues most modern buildings. Floor panel 8 is attached to the top of the floor joist by means of a floor panel connector 16, seen in FIG. 15. Floor panel connector 16 comprises a pair of downwardly extending clamps 150 which contain punched prongs for grasping the upper truss of the floor joist, and a 90° rotated upwardly extending clamp 148 containing similar prongs for grasping the 2 × 4s 88 of floor panel 8. By utilization of the novel clips seen in FIG. 15, the floor panels may be simply and easily installed by merely walking over the floor panel until they are properly seated in the previously placed clips.

FIG. 9 illustrates a side sectional view of a foundation panel 9 which comprises a core 94 having one finished side 92 thereover. Foundation panels 9 are anchored to the foundation pedestals 2, the bottom portion of panel 9 being cut to compensate for sloping grades. The top edge of panel 9 is reinforced, as at 93, to support the wall panels thereover. Flashing 96 is provided for waterproofing.

Illustrated in FIGS. 10a–d are various views of a typical exterior wall panel which comprises a prefabricated sandwich-type panel having an insulating core 106. As viewed in FIG. 10b, the exterior wall panel has an exterior finish 110 which, for example, may comprise plywood, a finished interior panel 108 which may comprise, for example, plywood or gypsum wallboard with a finished surface or applied finish, both surrounding the insulating core 106. As seen in FIG. 10a, reinforcement in the form of vertical 98 and horizontal 100 sheet metal reinforcing is built in on opposite faces of the core 106 in directions perpendicular to one another. Adjacent panels, as seen in FIG. 10c, have an L-shaped edge so that they overlap to provide a common axis for joining by means of a screw 104. Preferably, as seen in FIG. 10d, tubes 102 are provided at the point where the panels 10 are to be joined to either one another or to a structural frame member 7, as will be shown in more detail hereinafter. Tubes 102 preferably have flared ends such that the core insulation will not be unduly stressed when the panels 10 are screwed to the metal portions 78 of the structural frame members 7. The insulating core 106 may, for example, be comprised of a plastic foam or the like, while door and window openings could be provided in specially built wall panels, as should be apparent to a person of ordinary skill in the art.

Referring now to FIG. 11a, a preferred embodiment of a ceiling panel 11 is shown which includes an opening 114 for a light fixture, if required. Ceiling panel 11 comprises preferably an insulating panel having a finished surface. As viewed in FIG. 11c, panel 11 includes a foam insulation 124 over which is attached a vapor barrier 126 and gypsum board or the like 118 applied thereover as the finished ceiling surface. On top of foam insulation 124 is another layer of foam insulation 122 which is attached to a roof joist bridging 120. The entire panel fits between the bottom chords of the roof joist. A batten 116 is applied on the underside of the chord 120 to hold the panel in place.

FIG. 11b illustrates a cross section of a ceiling joint at a bottom chord of a truss of the roof joist 117. In this view it is clearly seen that a foam insulation board 122 is attached to joist bridging 120, while foam insulation board 124 is attached to the gypsum board 118 via a vapor barrier 126.

Referring now to FIG. 12a, a top view of a roof panel is illustrated which is basically formed of a formed fiberglass unit which is structured to fit the contour of the structural frame system, i.e., the width is equivalent to the distance between adjacent structural framemembers. The panels 13 are anchored to the top chord of the roof joist which is then flashed by flashing 130 for waterproofing, as seen in FIG. 12c. Roof panel 13 includes a plurality of corrugations 128 which extend laterally therealong the bottom portion thereof.

Referring now to FIG. 12b, a roof panel connection at an interior bearing wall is depicted in which expandible weatherproof flashing 144 is embedded in epoxy cement 142 at the junction of roof panels 13, which are attached to frame members 7 before the flashing 144 is applied to the joint.

FIG. 12d illustrates a perspective of the roof panel joint in which the two roof panels 13 are joined to the top chord 140 of the truss by means of a metal clip 134 and nail 136 which extends therethrough to chord 140. A joint cover 138 may also be provided as shown. Note that the bottom edges of joint cover 138, as well as the bottom edges of clip 136 are respectively flared inwardly and outwardly in order to provide a secure fit with one another.

As appreciated by FIG. 12c, the roof panels are designed so as to be stackable one inside the other for easy storage and shipment. FIGS. 13a and b show end and sectional views of the roof panel end cap 14, shown in place in FIG. 12a. Roof panel end cap 14 comprises a unit formed from fiberglass and is provided to reinforce the overhanging ends of the roof panels 13. A rain gutter 132 may also be attached to end cap 14 as shown.

Figure 14:
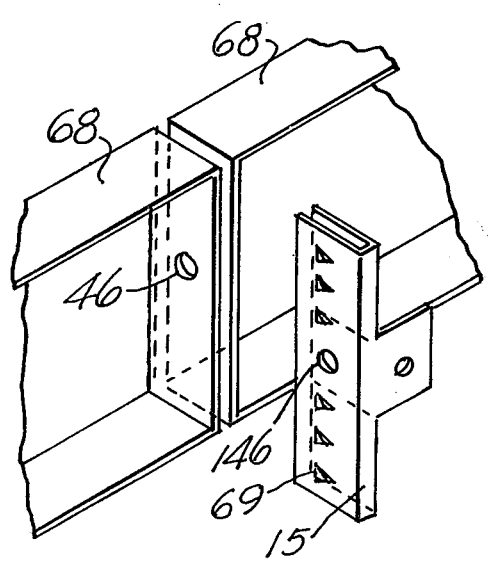
FIG. 14 is a perspective view of a panel connector utilized with the structural frame members of FIG. 7.

FIG. 14 illustrates a novel panel connector 15 for structural frame member 7 which comprises a stamped metal piece having a plurality of punched prongs 69 for quick attachment of one frame member 68 to another. The punched prongs 69 are constructed with the points thereof facing in the opposite direction of installation, which allows the connector 15 to be forced in place, but, at the same time, presents same from slipping off once installed. An aperture 146 is provided in panel connector 15, as well as in frame members 68, for allowing electrical wiring to pass unobstructed therethrough.

Figure 16:
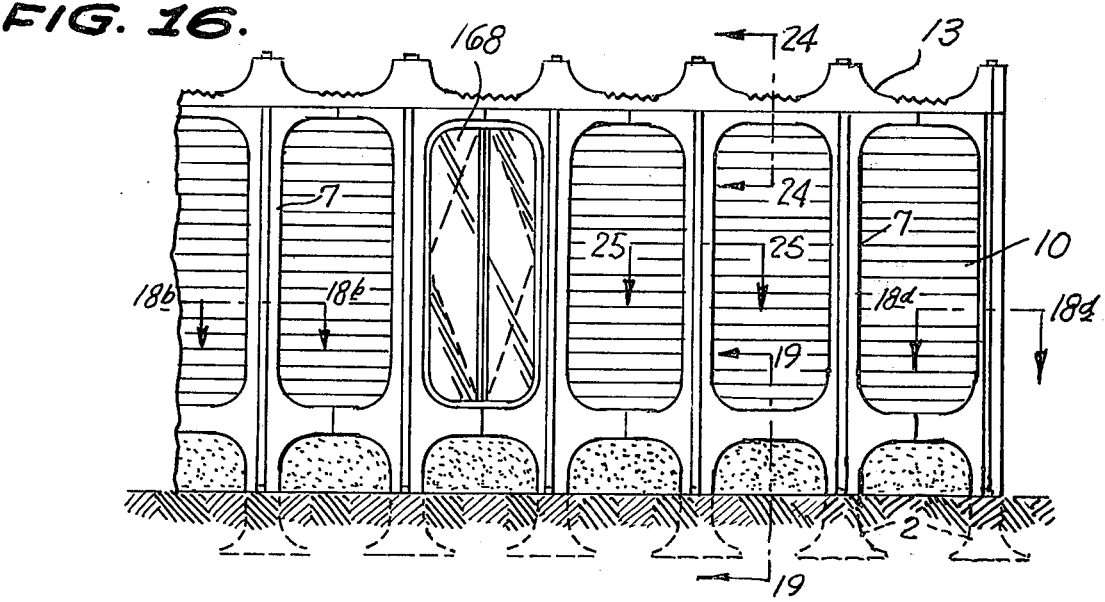
FIG. 16 is a partial side elevational view of the modular components in a constructed form in accordance with the teachings of the present invention.
Figure 17:
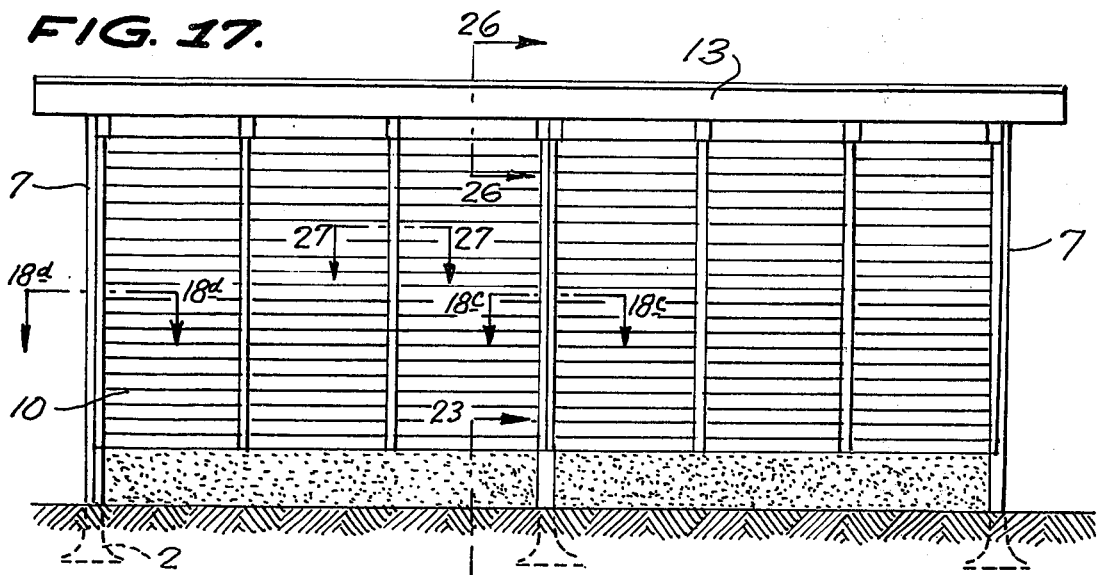
FIG. 17 is an end elevational view of the unit depicted in FIG. 16.

FIGS. 16 and 17 respectively illustrate a partial side elevation and end elevation of external and completed modular units consisting of foundation pedestals 2, structural frame members 7, and roof panels 13. The wall panels 10 illustrated preferably comprise a plywood face having horizontal grooves therein for aesthetics. A window 168 may be placed within the contour of a pair of adjacent frame members 7 as shown in FIG. 16. Further, square or rectangular windows may be utilized as desired.

Figure 18A:
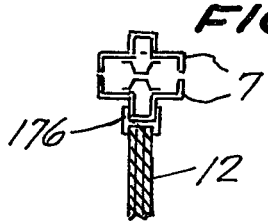
FIG. 18a is a sectional view of an interior center wall connection is accordance with the present invention.

FIG. 18a illustrates an interior center wall joint comprising a pair of frame members 7 attached back to back with an interior wall panel 12 connected by means of trim 176. FIG. 18b is a cross section illustrating a typical exterior wall joint taken along lines 18b—18b of FIG. 16 which comprises an interior wall panel 12 connected to the junction of exterior wall panels 10 and frame member 7.

Figure 18C:
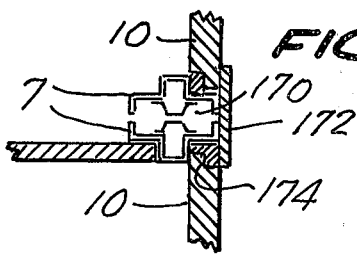
FIG. 18c is a sectional view of an exterior center wall connection taken along lines 18c—18c of FIG. 17.
Figure 18B:
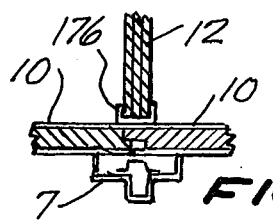
FIG. 18b is a sectional view of an exterior wall joint taken along lines 18b—18b of FIG. 16.
Figure 18D:
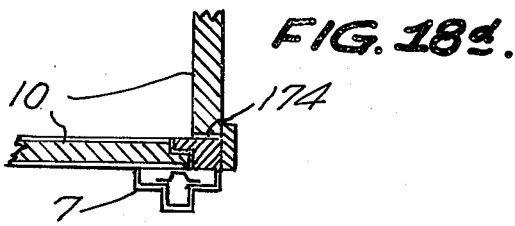
FIG. 18d is a sectional view of an exterior corner connection taken along lines 18d—18d of either FIG. 16 or 17.

FIG. 18c represents a cross section taken along lines 18c—18c of FIG. 17 which illustrates the cross sectional connection of an exterior center wall wherein the interior wall panel 12 is shown connected to frame members 7 which abut a pair of exterior wall panels 10 and are joined by means of a batten 172. A rigid filler 174 is provided in the space normally reserved for the abutting exterior wall. FIG. 18d illustrated an exterior corner connection as viewed along lines 18d—18d of FIG. 7. The exterior corner consists of two right angle directed exterior wall panels 10 and a structural frame member 7 joined to one of the panels. A rigid filler 174 again fills the gap normally occupied by the abutting edge of the adjacent exterior wall panel.

Considering now FIGS. 19, 24 and 25, there are considered various cross-sectional views showing the coupling modes of an exterior bearing wall section taken along the respective cross-sectional lines of FIG. 16. FIG. 25 illustrates a typical exterior wall connection of a pair of wall panels 10 to the metal conduit 78 of structural frame member 7. A batten 116 closes the joint as shown. FIG. 19 illustrates the bottom portion of a wall panel 10 being secured to the bottom portion of a foundation panel 9, both being secured to the lower horizontal member 68 of structural frame member 7. A base molding 152 is provided with a filler 151 as shown. The floor panel 8, floor joist 5, and floor joist bracket 4 are as shown. FIG. 24 illustrates the roof panel 13 and associated interconnections. Upper horizontal member 66 of frame 7 has the wall 10 attached thereto and flashing 156 placed therebetween and rigid insulation filler 158. An insulating ceiling panel 11 is attached to the joist, as described above, and a trim piece 154 is placed thereover.

FIG. 20 illustrates the cross section of a typical ceiling joint taken along lines 20—20 of FIG. 1. Illustrated in FIG. 20 are a bottom chord 117 of roof truss 18, the top chord 140 securing the roof panel joint connection as explained above in connection with FIG. 12d. The metal cap 138 covers the joint. The insulated ceiling panel 11 and batten 116 are placed as shown.

FIG. 21 illustrates the cross section of an interior partition at the ceiling portion in which the interior partition 12 is attached to the lower chord 117 of the roof joist 18. A metal angle 166 is anchored to the roof joist, the partition being finished off by trim members 162.

FIG. 22 illustrates the floor cross section of an interior partition wherein the floor panel 8 is placed on the top chord 115 of floor joist 5 as shown, the interior partition 12 having a metal angle 166 placed therebetween and the upper surface of floor panel 8. The connecting portion of interior partition 12 to floor panel 8 is finished off by a base member 152.

Figure 26:
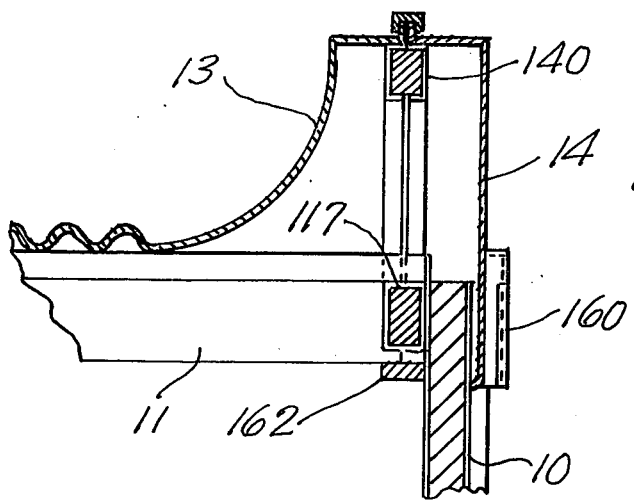
FIG. 26 is a sectional view of an exterior end wall taken at the roof portion along lines 26—26 of FIG. 17.
Figure 27:
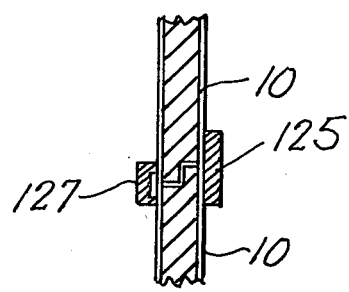
FIG 27 is a sectional view showing the exterior wall connection taken along lines 27—27 of FIG. 17.
Figure 23:
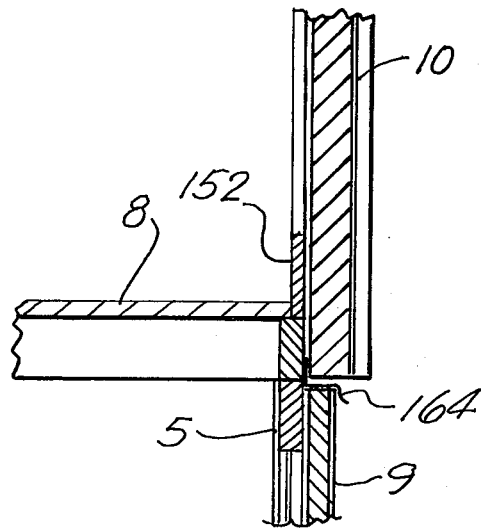
FIG. 23 is a sectional view of an exterior end wall connection taken along lines 23—23 of FIG. 17.

FIGS. 23, 26 and 27 illustrate several cross sections of an exterior end wall taken along corresponding lines in FIGS. 16 and 17. For example, FIG. 23 illustrates the placement of a wall panel 10 over a foundation panel 9 adjacent a floor joist 5, flashing 164 placed between the bottom portion of wall panel 10 and the upper portion of foundation panel 9. The interior portion of the junction of floor panel 8 with wall panel 10 is finished off by means of a base molding 152 as shown.

FIG. 26 illustrates the connection of roof panel 13 and end cap 14 to both the top chord 140 of roof joist 18 and the bottom chord 117 thereof to which is also connected the insulating ceiling panel 11. Provided on end cap 14 is a molded in cover 160, while trim 162 finishes off the junction between ceiling panel 11 and wall panel 10.

FIG. 27 illustrates a cross section at a vertical joint taken along lines 27—27 of FIG. 17. Very simply, exterior batten 125 and interior batten 127 serve to join the junction of wall panels 10.

SOLAR COLLECTOR ROOF PANEL

Figure 28:
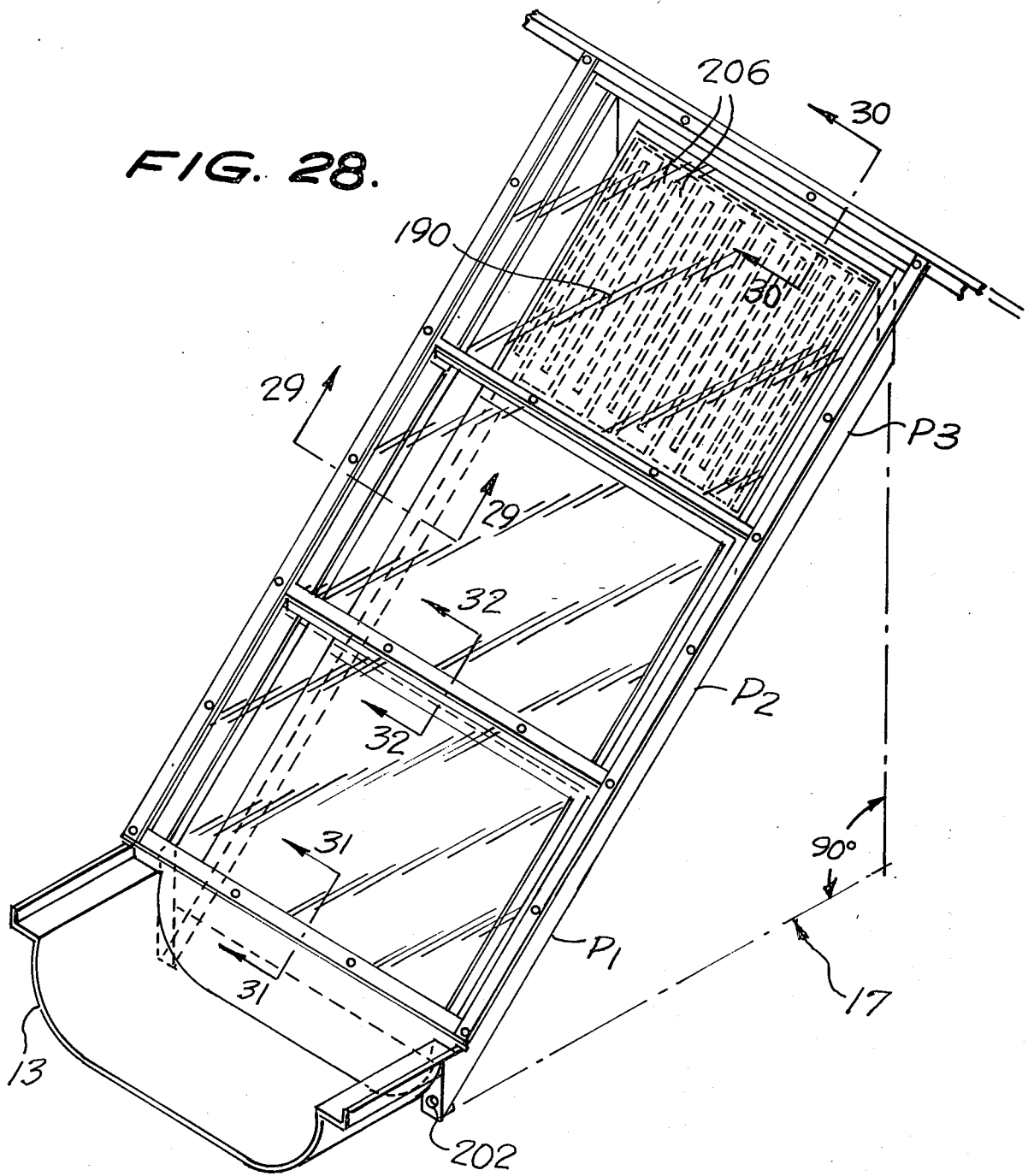
FIG. 28 is a perspective view of a solar collector roof panel constructed in accordance with a preferred embodiment of the present invention.
Figure 29:
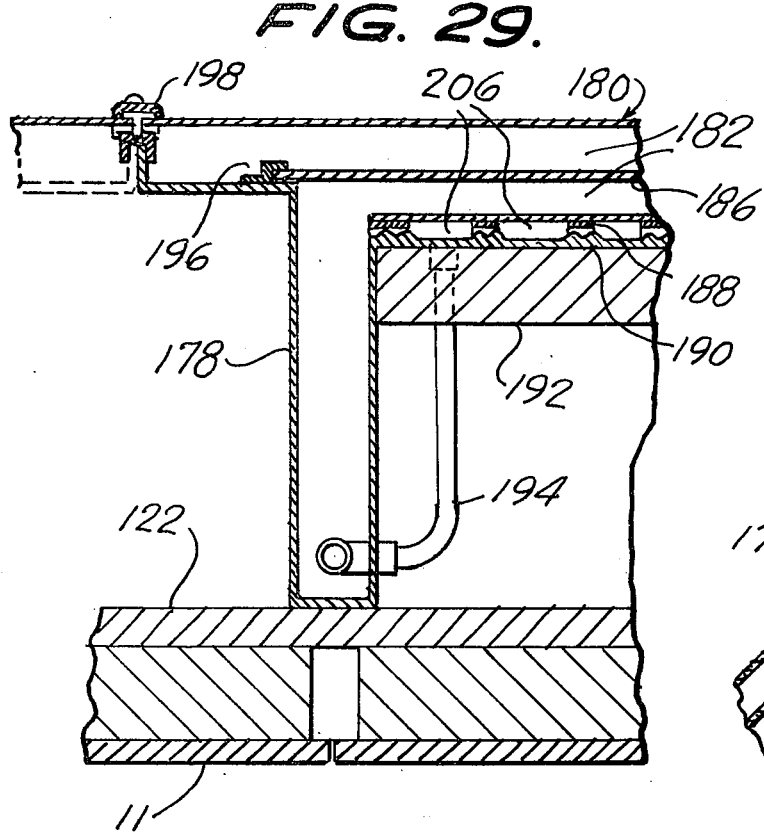
FIG. 29 is a sectional view of the solar collector roof panel taken along lines 29—29 of FIG. 28.

Referring now to FIGS. 28 through 32, there is shown in some detail a preferred embodiment of a solar collector roof panel in accordance with the present invention. As seen in FIG. 28, solar panel 17 is seen to consist, in a preferred embodiment, of three substantially identical equal absorption panels P1, P2, and P3. As perhaps best seen in FIG. 29, a typical panel includes a glass reinforced polyester roof panel body 178 which is formed into a plurality of caulking grooves 190 formed in the central base portion thereof. As perhaps best viewed in FIG. 28, grooves 190 are interdigitated within a single panel P3 so as to provide a continuous but circuitous closed fluid channel 206 therebetween.

Referring again to FIG. 29, a light gauge metal plate 186, whose exposed upward side is finished in light-absorbing black, is bonded to the polyester roof panel 178 by means of a silicon caulking 188 placed along the caulking grooves 190. For insulative purposes, a preferably two-inch insulation 192 is placed on the underside of roof panel 178 at the central body portion thereof. Placed over metal plate 186 is a layer of insulating glass 184 which is held in place by means of a metal edge frame 196. A further layer of tempered or acrylic glass 180 is placed over glass layer 184 and is anchored by a metal frame and weather seal 198 as shown. Glass layers 180 and 184 are provided with air space 182 therebetween in order to effectively insulate the unit. A supply or return pipe 194 is provided such that fluid may be supplied to water tubes 206. Finally, the entire roof panel 178 is attached to ceiling panel 11 via foam insulation board 122 as shown.

In operation, the water is circulated through the conduit 206 provided by the configuration of the grooves 190 and the metal plate 186 and is heated by sunlight which is absorbed by plate 186 through the black layer. This is an extremely economical configuration in which no separate water tubes need be provided, the ordinary construction of solar roof panel 178 inherently providing same. Further, the silicon caulking remains extremely flexible at high and low temperatures and bonds to metal plate to the roof panel. Inlet and outlet connections are preformed in panel 178 to which the supply and return lines are connected. The sectional division of the solar panel serves to allow for expansion and contraction thereof without breaking the bond of the silicon caulking.

Figure 32:
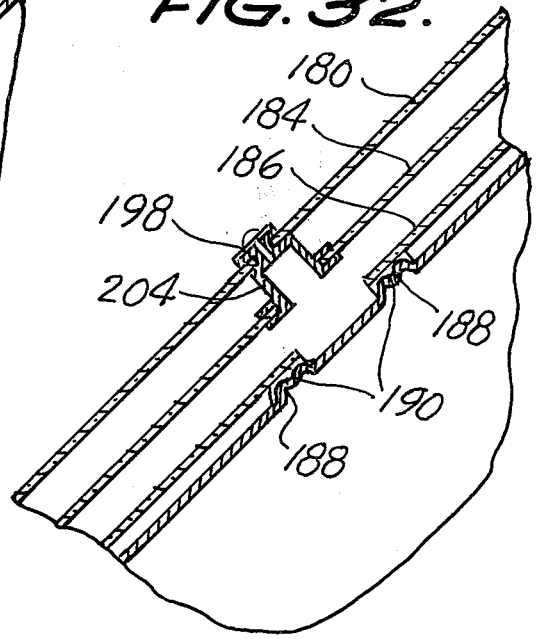
FIG. 32 is a sectional view showing the intermediate support connection taken along lines 32—32 of FIG. 28.

FIGS. 30, 31 and 32 respectively illustrate the top edge, bottom edge, and intermediate support detail taken along lines 30—30, 31—31, and 32—32 of FIG. 28. Referring to FIG. 30, a metal frame and seal 200 is provided at the apex of the glass layer 180, while in FIG. 31 a metal seal and frame 200 is provided as shown. At the intermediate support, seen in FIG. 32, a structural support member 204 with an intermediate mullion is provided and held in place through the layer of glass 180 by a metal batten and weather seal 198.

WARM AIR SOLAR PANEL

Depicted in FIG. 33a is a warm air solar panel which may preferably be used in conjunction with the standard roof panels 13 in accordance with the present invention. The panel 13 has a round metal pipe 208 snaked therethrough which is preferably painted black to absorb heat radiating through a glass cover 220. The air is returned through a cold air return 218 to travel through the metal pipes 208 and a blower 210 is provided for circulating the heated air to the habitable space below. In FIG. 33a, a metal insert 212 is depicted which is inserted within the metal pipes 208 in order to aid heat transfer to the air blowing therethrough. Inserts 212 comprise a plurality of intersecting metallic members 214 having curved edges 216 in order to conform to the inner circumference of pipes 208.

FIG. 34 illustrates a heat absorption-radiation wall panel for use in conjunction with the modular building structure of the present invention and which may be utilized during sunlight hours in a correctly oriented wall. The wall panel comprises an outer glass layer 230 and an inner metal panel 232 whose exterior surface 234 is painted black to absorb the heat extending through glass panel 230. A cold air damper 226 is provided at the bottom of metal panel 232, while another manually operated damper 224 is placed at the top thereof for convection heat circulation as shown. Between glass panel 230 and metal panel 232 is interposed a plurality of hinged insulation panels 228 which are pivoted about pivot points 240. Each of the hinged insulation panels 228 includes a reflective surface 238. When the panel is exposed to sunlight, the insulation panels 228 are rotated, either manually or thermostatically, to the proper angle in order to expose the black surface 234 of panel 232 to the sun rays in order to absorb heat and transmit it to the interior space of the structure. If further heat is desired, the hinged insulation panels 228 may be further lowered in order to bring the reflective surfaces 238 into play by acting as reflectors and intensifiers of the solar radiation. The glass panel 230 may be set in an aluminum frame and mounted on a special extension 222 of floor joists 5.

WIND POWERED FRICTION HEATER

Depicted in FIGS. 35 through 37 is a wind powered friction heater which may preferably be utilized to heat water in conjunction with the solar heater water storage tank 19 either as a main or an auxiliary source of heat. Seen in FIG. 35 is a perspective, partially cutaway view of the friction heater which includes a central rotating shaft 242 connected to a wind mill (not shown) extending upwardly through the structure. The shaft 242 is connected through a bearing 254 (FIG. 36) to rotate an inner cylindrical member 250 which contains a plurality of vertically spaced slots 252. Within slots 252 are housed a plurality of nylon brushes 248 which are urged outwardly by springs 256. The outward urging of nylon brushes 248 extends same against the inner circumference of a cast aluminum casing 244. Cast aluminum casing 244 includes a plurality of radially extending fins 246 to assist in the heat dissipation. In operation, the rotation of the shaft 242 by the wind mill causes concomitant rotation of inner casing 250 to cause the brushes 248 to rub against the inner circumference of outer casing 244 which generates heat, due to friction, which is then transmitted to the surrounding water in the tank. The wind powered friction heater described above may be used as an auxiliary water heater to the solar collector roof panel of FIG. 28, or as an independently operating unit in the appropriate environment.

It is seen by virtue of the foregoing that I have provided a unique and novel modular building system whose components may be easily and quickly assembled on the building site without the need for special tools or heavy equipment. The entire system could be preassembled, if desired, in modules twelve feet wide by either 12, 16, 24 or 32 feet long. It would also be possible to construct a two-story structure with the present invention. This would only require a modification to the floor joist bracket in the form of a slotted extension on the top and bottom to join together the structural frame member for the first and second floor.

It is seen that by virtue of the foregoing I have provided a modular building system that is within the economical reach of a large segment of the population. It is estimated that the greatest savings could be achieved by a person assembling the system himself. Outside of the electrical, plumbing and duct work, it is submitted that the interconnection of elements, as described above, is sufficiently simple to enable an unskilled person to construct same.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured By letters patent of the United States is:

1. A modular building system, which comprises: a substantially planar elongated frame member for providing vertical structural rigidity to the modular building system, said frame member having means for providing horizontal structural rigidity to said system, said means comprising a pair of members which extend integrally and transversely from said frame member near the upper and lower ends of said frame member, each of said ends having a longitudinal slot formed therein for slidable engagement with means for supporting said frame member.

2. The modular building system as set forth in claim 1, wherein said supporting means comprises a joist bracket constructed of substantially planar mirror-image halves having a pair of parallel projections extending therefrom which define a longitudinal slot for interlocking engagement with said longitudinal slot of said elongated frame member.

3. The modular building system as set forth in claim 2, wherein said joist bracket includes means for connecting a roof of floor joist between said halves thereof.

4. The modular building system as set forth in claim 3, wherein said connecting means includes a plurality of apertures formed in the respective halves of said joist bracket which are co-linear with corresponding apertures formed in the associated joist.

5. The modular building system as set forth in claim 3, further comprising a foundation pedestal to which said joist bracket is secured, said pedestal comprising a hollow body having a circular base and cross members tapering upwardly therefrom.

6. The modular building system as set forth in claim 5, further comprising a foundation pedestal spacer which comprises a channel-shaped member having a plurality of threaded stakes placed at predetermined intervals therealong, said stakes seving as leveling means for said spacer and defining the position of each of said foundation pedestals whose bases are placed adjacent said channel-shaped member.

7. The modular building system as set forth in claim 6, wherein said channel-shaped member further includes a plurality of pairs of punched-out guides extending upwardly from said spacer and serving to further aid in the placement of said foundation pedestals.

8. The modular building system as set forth in claim 6, further comprising a roof panel of a general U-configuration whose width corresponds to said predetermined interval of said threaded stakes on said foundation pedestal spacer, said roof panels having flanges extending longitudinally along the outer edges thereof.

9. The modular building system as set forth in claim 8, further including means for attaching adjacent roof panels to one another and to the upper truss of said roof joist.

10. The modular building system as set forth in claim 5, wherein each of said joist brackets includes a pair of anchor brackets extending downwardly therefrom for engagement with the upper portion of one of said cross members of said foundation pedestal.

11. The modular building system as set forth in claim 5, further comprising a foundation pedestal extension of the same general cross-section as said upwardly tapering cross members of said foundation pedestal, said extension being fittable over said pedestal.

12. The modular building system as set forth in claim 3, wherein said frame member includes means for routing electrical wiring therethrough and means to which wall panels are attachable.

13. The modular building system as set forth in claim 12, wherein said routing and attachable means comprises a channel member positioned longitudinally on the inner surface of said frame member so as to define a conduit within which said electrical wiring may pass, the outer surface thereof serving as said wall panel attachable means.

14. The modular building system as set forth in claim 13, wherein said frame member includes an integrally formed substantially U-shaped portion along the length thereof over which said channel member is positioned.

15. The modular building system as set forth in claim 3, further comprising a prefabricated floor panel which includes a plurality of parallel beams positioned transverse to said floor joists, insulation means positioned between said beams, and a floor surface positioned over said insulation.

16. The modular building system as set forth in claim 15, further comprising clip means for connecting said floor panel to said floor joist, said clip means comprising a pair of identical concave clip members joined at their bases and angularly rotated with respect to one another, the flanges of said clip members including prongs punched therein for grasping said beams and said floor joists, respectively.

17. A modular building system, which comprises:
a plurality of joists which extend in a substantially parallel spaced fashion along a first direction;
means extending in a second direction transverse to said first direction for supporting said joists which comprises juxtaposed structural frame members each having an elongated vertical midsection and a pair of integral horizontal support arms extending in said second direction from the upper and lower ends thereof, respectively, the horizontal support arms from juxtaposed frame members contacting one another for providing horizontal structural stability for said system.

18. The modular building system as set forth in claim 17 further comprising means for connecting one of said joists to a respective end of a structural frame member.

19. The modular building system as set forth in claim 18 wherein said connecting means comprises slotted means formed in said respective end of said structural frame member for vertical sliding engagement with a similarly sized elongated slot formed near an end of said joist.

20. The modular building system as set forth in claim 19 wherein said slotted means comprises an elongated vertical channel formed between a pair of vertical flanges extending from said respective end of said frame member.

21. The modular building system as set forth in claim 20 wherein said connecting means further comprises a joist bracked mounted on the end of said joist and having a pair of vertical flanges which define said similarly sized elongated slot therein.

22. A modular building system, which comprises:
a frame member having an elongated vertical midsection defining its longitudinal axis, upper and lower end sections extending integrally from said midsection, and upper and lower horizontal support arms integrally extending from said upper and lower end sections, respectively, the respective ends of said upper and lower end sections each being substantially planar and having means comprising a longitudinal slot coaxially formed therein and open to said ends for permitting crosswise interfitting engagement with other support members of the modular building system.

23. The modular building system as set forth in claim 22, wherein said longitudinal slots of said upper and lower end sections extend inwardly from said respective ends coaxially with said longitudinal axis and terminate in the respective upper and lower end sections.

24. A modular building system, which comprises:
a frame member having an elongated midsection, substantially planar end sections extending integrally from said midsection each of which include a support element extending integrally in a direction transverse to said elongated midsection, said substantially planar end sections each having a co-planar terminated slot extending inwardly from the respective ends thereof, said slots being substantially coaxial with the longitudinal axis of said elongated midsection of said frame member.

* * * * *